W. H. STEWART.
SECTIONAL ROD.
APPLICATION FILED APR. 19, 1909.

1,010,702.

Patented Dec. 5, 1911.
2 SHEETS—SHEET 1.

Witnesses:
H. B. Davis.
Cynthia Doyle.

Inventor:
William H. Stewart
by Hoyt & Harriman
Atty's

W. H. STEWART.
SECTIONAL ROD.
APPLICATION FILED APR. 19, 1909.

1,010,702.

Patented Dec. 5, 1911.

2 SHEETS—SHEET 2.

Witnesses:
H. B. Davis.
Cynthia Doyle.

Inventor:
William H. Stewart
by Rogers Hamilton
Atty's

UNITED STATES PATENT OFFICE.

WILLIAM H. STEWART, OF BOSTON, MASSACHUSETTS.

SECTIONAL ROD.

1,010,702.　　　　　Specification of Letters Patent.　　　Patented Dec. 5, 1911.

Application filed April 19, 1909. Serial No. 490,692.

*To all whom it may concern:*

Be it known that I, WILLIAM H. STEWART, of Boston, county of Suffolk, State of Massachusetts, have invented an Improvement in Sectional Rods, of which the following is a specification.

This invention relates to sectional-rods for use in conduits of any kind and for other purposes, and has for its object to improve the construction of the same to the end that the sections may be easily and quickly connected together by a transverse movement relative to each other, when angularly disposed but not otherwise, and permitting disconnection only by a transverse movement when angularly disposed; and that a flexible connection is produced which permits relative movement of the sections in one direction only.

The invention also has for its object to provide the sections with flat faced abutments at the ends, adapted to engage each other, to enable the connected sections to be moved along against a moderate resistance; also to form said abutments with inclined faces; also to provide guards on the joint connections designed to save wear; also to provide an improved supplemental connecting-device for connecting the sections together; also to provide connecting means for connecting together the coupling-members which are arranged at the opposite ends of each section so that in case a section breaks the connected sections, as a whole, will not part.

Figure 1:
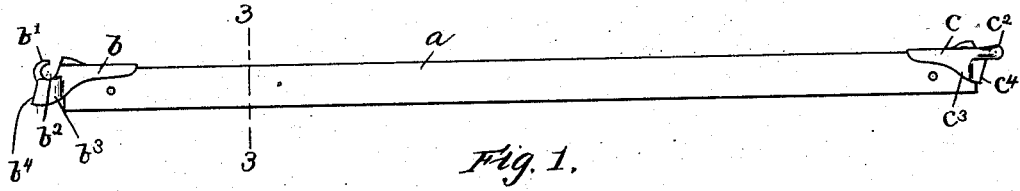
Figure 2:
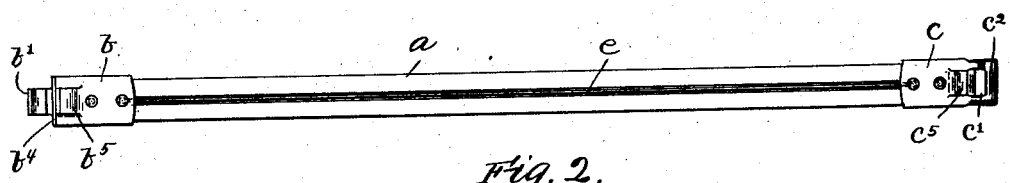
Figure 3:
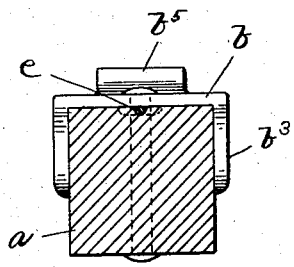
Figure 4:
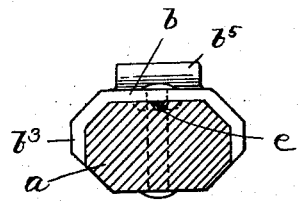
Figure 5:
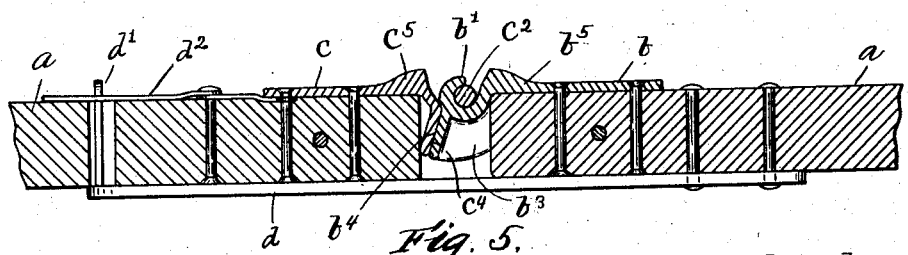
Figure 6:
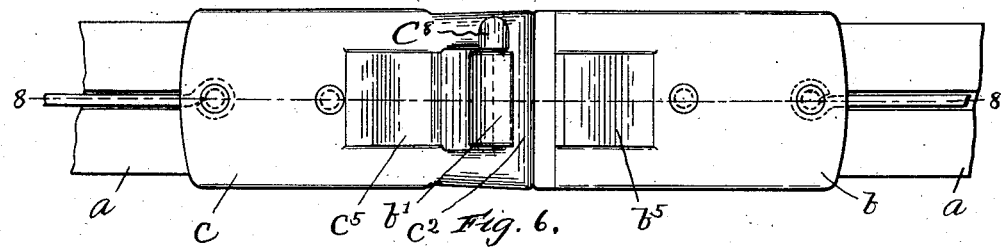
Figure 7:
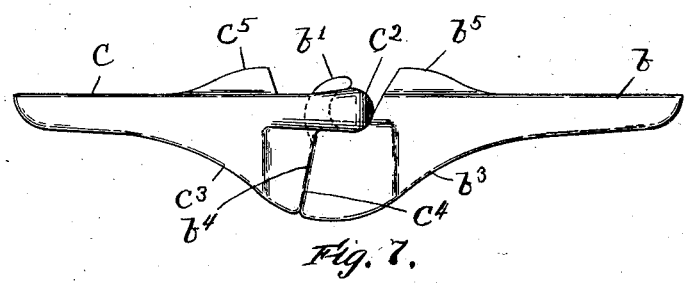
Figure 8:
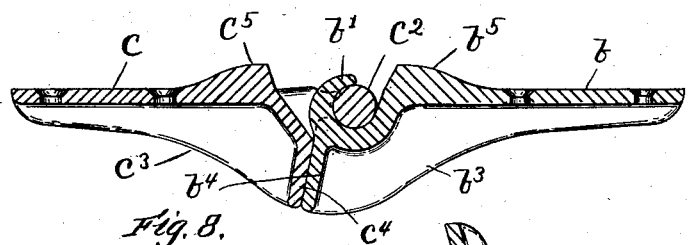
Figure 9:
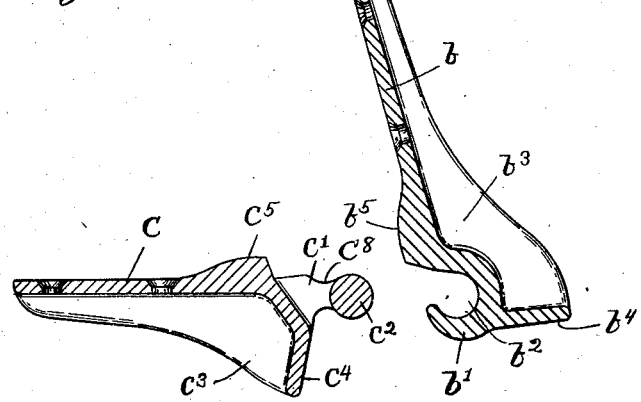

Figure 1 is a side-elevation of the sectional-rod embodying this invention. Fig. 2 is a plan view of the same. Fig. 3 is a transverse-section taken on the dotted line 3—3, Fig. 1. Fig. 4 is a similar transverse-section of a modified form of bar. Fig. 5 is an enlarged side view of the adjacent end portions of two rods. Fig. 6 is an enlarged plan view of the coupling-members on the adjacent ends of the two sections. Fig. 7 is a side elevation of the coupling-members shown in Fig. 5. Fig. 8 is a longitudinal section of the coupling-members shown in Fig. 5, taken on the dotted line 8—8. Fig. 9 represents longitudinal sectional details of the coupling-members shown in Fig. 5.

$a$ represents the rod or bar of one of the sections. It is made of wood or other material, and quadrangular in cross-section, see Fig. 3, or hexagonal in cross-section see Fig. 4, or any other suitable shape, and it is made of any desired length. Said bar has at each end a coupling-member adapted to engage respectively fellow coupling-members on the adjacent sections.

The coupling-member at one end of the bar consists of a shank $b$, adapted to be secured to the bar, having at its extremity a curved hook $b'$, which is extended upwardly and rearwardly to form a recess $b^2$, of circular form, which is open at each end and at the side from end to end. The end of the hook terminates near the shank so that the side opening to the recess is at the rear side of the recess and also is of less width than the diameter of the recess. Beneath the shank $b$ a recess $b^3$ is formed of a shape adapted to receive the end of the bar, and the end wall of said recess $b^3$ serves as an abutment $b^4$, and is formed with a flat abutting face which extends the entire width of the member. On top of the shank $b$ a projection $b^5$ is formed which extends to a point above the top of the hook, or thereabout, and serves as a guard to save wear on the end of the hook as the device is moved along. The coupling-member at the opposite end of the section consists of a shank $c$, adapted to be secured to the bar having a loop or eye $c'$ at its extremity, the front bar $c^2$ of which is made cylindrical and of a size to approximately fit the recess $b^3$ in a fellow coupling-member, hence said front bar is of larger diameter than the width of the side opening to the recess. One of the side portions of said loop is reduced in size at a point adjacent the front bar, as at $c^3$, so as to be of no greater width than the width of the side opening to the recess, thus permitting said cylindrical front bar to enter said recess $b^2$, at one end, by an endwise movement thereof, due to a transverse movement of one section relative to the other when the sections are angularly disposed, the reduced part of the loop moving along in the narrow side opening to the recess back of the hook. When the sections have been thus connected together they are then moved rotatably with respect to each other, to bring them into alinement. Beneath the shank $c$, a recess $c^5$ is formed which is shaped to receive the end of the bar, and the end wall of said recess serves as an abutment $c^4$, and is provided with a flat abutting face which extends the entire width of the member. On top of the shank $c$ a projection $c^5$ is formed, which extends to a point above the top of the hook of a fellow coupling-member or thereabout, said projection serving as a guard to save wear on the end of the hook which projects up through the loop, as the connected sections are drawn over surfaces which they engage. The sections are connected together by the hook of one coupling-member engaging the loop of the next coupling-member, and so on. The coupling-members, when thus constructed, provide a certain degree of flexibility to the sectional rod, that is to say, they permit the sections to be moved angularly relative to each other in one direction although held fixedly against movement in all other directions.

When two coupling-members are in engagement and the sections in alinement the two flat-faced abutments $b^4$, $c^4$ occupy positions between the ends of the sections and engage each other over all and enable the connected sections to be advanced by considerable endwise pressure upon them against a moderate resistance. The engaging-faces of the abutment are inclined to increase the leverage and improve the efficiency of the device, as a whole.

In addition to the hook and loop coupling-members, herein shown, a supplemental connecting-device may be employed, which, as here shown, consists of a plate $d$ attached to one end of a section by bolts or otherwise and having a latch $d'$ which passes up through a hole in an adjacent section, and is adapted to be engaged by a link $d^2$ on said adjacent section. Each section also has means extending through its length for connecting the two coupling-members arranged at the ends thereof together, so that in case the section breaks, while in use, the connected sections as a whole will not part. As here shown, a wire $e$ is employed for this purpose, which extends throughout the length of the section, preferably entering a groove formed therein, which is connected at its opposite ends to the shanks of the two coupling-members.

Having thus described my invention, what I claim as new and desire to secure by Letters Patent is:—

1. A sectional-rod composed of several sections adapted to be connected together, each section consisting of a bar having at each end a coupling-member, the coupling-member at one end having a hook extended upwardly and rearwardly to arrange the opening to its recess at the rear side, and the coupling-member at the opposite end having a loop to receive the hook of an adjacent section, one of the side arms of the loop being recessed, permitting the front bar of the loop to enter the recess of the hook by a transverse movement of one member relative to the other when the members are angularly disposed, substantially as described.

2. A sectional-rod composed of several sections adapted to be connected together, each section consisting of a bar having at one end a hook-member and at the other end a loop-member, to respectively engage a loop-member and a hook-member on adjacent sections, the hook-member having the recess of its hook open at each end and at the side from end to end, the side opening being arranged at the rear side of the recess and the loop-member having one of the side arms of its loop recessed, whereby engagement of the members is permitted when the sections are angularly disposed and alinement of the sections permitted by a partial rotary movement of the members, substantially as described.

3. A sectional rod, the sections of which are adapted to be coupled together by coupling-members attached to the ends of the sections, one of the coupling-members having a curved hook with the recess back of said hook of larger diameter than the width of the side opening of the hook, and the other coupling-member having a loop, the front bar of which is made larger in diameter than the width of the side opening to the recess back of the hook and one of the side arms of which is made of a width permitting its free passage along said side opening, whereby the members are coupled by a transverse relative movement when angularly disposed, substantially as described.

4. A sectional rod, the sections of which are adapted to be coupled together by coupling-members attached to the ends of the sections, one of the coupling-members having a curved hook with the recess back of said hook of larger diameter than the width of the side opening of the hook, and the other coupling-member having a loop, the front bar of which is made larger in diameter than the width of the side opening to the recess back of the hook and one of the side arms of which is made of a width permitting its free passage along said side opening whereby the members are coupled by a transverse relative movement when angularly disposed, each coupling-member having an abutment with a flat abutting face arranged approximately at right angles to the direction of longitudinal thrust of the sections adapted to abut when the members are coupled together, substantially as described.

5. A sectional-rod composed of several sections adapted to be connected together, each section consisting of a bar having at each end, a coupling-member adapted to engage a coupling-member on an adjacent section and a plate secured to one end of said bar having a latch which extends through a hole in an adjacent bar, and a link at the other end of said bar arranged over a hole therethrough for engagement of a latch on an adjacent bar, substantially as described.

6. A sectional-rod composed of several sections adapted to be connected together, each section consisting of a bar having attached to each end a coupling-member adapted to engage a coupling-member on an adjacent section, and means extended throughout the length of the bar and attached to the coupling-members thereon to hold said members in case the bar breaks, substantially as described.

7. A sectional-rod composed of several sections adapted to be connected together, each section consisting of a bar having at each end a coupling-member adapted to engage a coupling-member on an adjacent section, and a wire extended throughout the length of the bar and connected at its ends to the coupling-members thereon, substantially as described.

In testimony whereof, I have signed my name to this specification, in the presence of two subscribing witnesses.

WILLIAM H. STEWART.

Witnesses:
 EDWIN C. PAIGE,
 HENRY B. DAVIS.

---

Copies of this patent may be obtained for five cents each, by addressing the "Commissioner of Patents, Washington, D. C."